US012619408B2

(12) United States Patent
Jo et al.

(10) Patent No.: US 12,619,408 B2
(45) Date of Patent: May 5, 2026

(54) METHOD AND APPARATUS FOR PIPELINE PARALLELISM COMPILING

(71) Applicant: MOREH CORP., Seoul (KR)

(72) Inventors: Gangwon Jo, Seoul (KR); Jungho Park, Seoul (KR)

(73) Assignee: MOREH CORP., Seoul (KR)

( * ) Notice: Subject to any disclaimer, the term of this patent is extended or adjusted under 35 U.S.C. 154(b) by 206 days.

(21) Appl. No.: 18/427,074

(22) Filed: Jan. 30, 2024

(65) Prior Publication Data

US 2024/0303057 A1    Sep. 12, 2024

(30) Foreign Application Priority Data

Mar. 6, 2023    (KR) ........................ 10-2023-0029483
Jul. 5, 2023    (KR) ........................ 10-2023-0087162

(51) Int. Cl.
*G06F 8/41*        (2018.01)
*G06F 11/14*      (2006.01)
*G06F 11/20*      (2006.01)
*G06F 11/30*      (2006.01)

(52) U.S. Cl.
CPC ................ *G06F 8/45* (2013.01); *G06F 8/443* (2013.01); *G06F 11/1407* (2013.01); *G06F 11/143* (2013.01); *G06F 11/1438* (2013.01); *G06F 11/2025* (2013.01); *G06F 11/2028* (2013.01); *G06F 11/203* (2013.01); *G06F 11/302* (2013.01)

(58) Field of Classification Search
None
See application file for complete search history.

(56) References Cited

U.S. PATENT DOCUMENTS

| | | | |
|---|---|---|---|
| 2016/0217368 A1* | 7/2016 | Ioffe ...................... | G06N 3/084 |
| 2019/0026624 A1* | 1/2019 | Steiner ................... | G06N 3/084 |
| 2019/0073580 A1* | 3/2019 | Dzhulgakov .......... | G06N 20/20 |
| 2019/0147337 A1* | 5/2019 | Yang ...................... | G06N 3/045 |
| | | | 706/25 |
| 2020/0012500 A1* | 1/2020 | Kern ...................... | G06F 9/445 |
| 2020/0226473 A1* | 7/2020 | Sharma ................... | G06N 3/09 |
| 2021/0133620 A1* | 5/2021 | Frank ................... | G06N 3/0464 |
| 2022/0164606 A1* | 5/2022 | Chamarthy ........... | G06F 18/217 |

FOREIGN PATENT DOCUMENTS

| | | |
|---|---|---|
| KR | 10-2020-0108789 A | 9/2020 |
| KR | 10-2021-0067311 A | 6/2021 |
| KR | 10-2021-0086491 A | 7/2021 |

\* cited by examiner

*Primary Examiner* — Qing Chen
(74) *Attorney, Agent, or Firm* — Banner & Witcoff, Ltd.

(57) ABSTRACT

A method for pipeline parallelism compiling is provided, which is executed by one or more processors, and includes receiving a source program associated with training of a machine learning model, determining, based on the source program, a plurality of operation groups including operations executed on training data of the machine learning model, generating a plurality of micro-batches from the training data, and determining, for each of the plurality of micro-batches, a plurality of operation sets corresponding to the plurality of operation groups.

20 Claims, 9 Drawing Sheets

Figure 5:
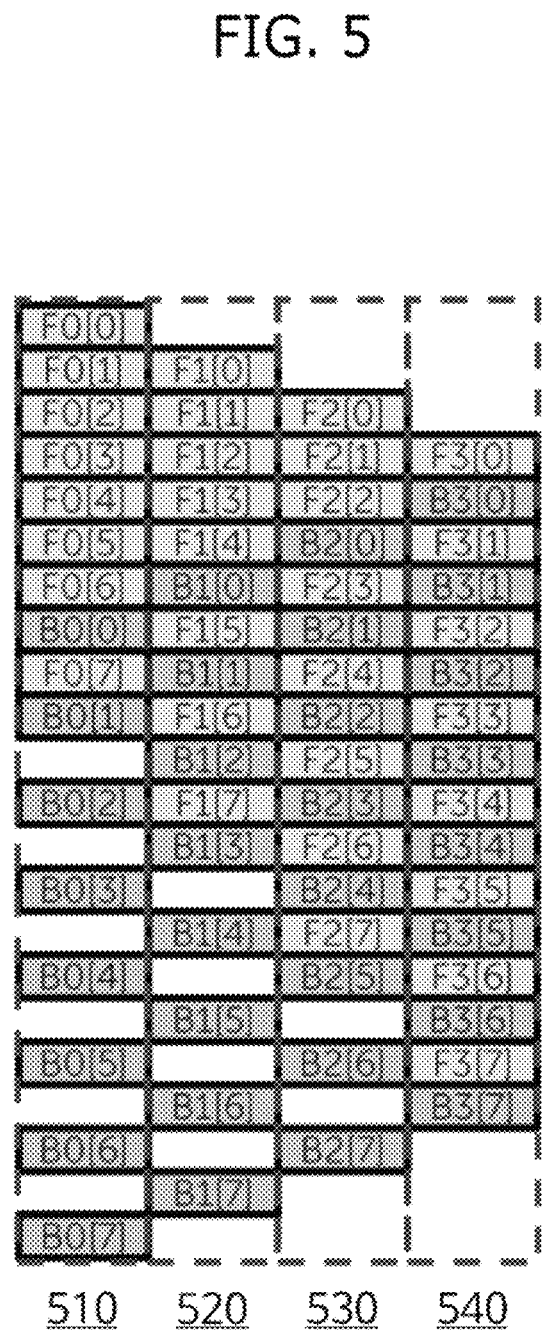

| 510 | 520 | 530 | 540 |
| --- | --- | --- | --- |
| F0[0] | | | |
| F0[1] | F1[0] | | |
| F0[2] | F1[1] | F2[0] | |
| F0[3] | F1[2] | F2[1] | F3[0] |
| F0[4] | F1[3] | F2[2] | B3[0] |
| F0[5] | F1[4] | B2[0] | F3[1] |
| F0[6] | B1[0] | F2[3] | B3[1] |
| B0[0] | F1[5] | B2[1] | F3[2] |
| F0[7] | B1[1] | F2[4] | B3[2] |
| B0[1] | F1[6] | B2[2] | F3[3] |
| | B1[2] | F2[5] | B3[3] |
| B0[2] | F1[7] | B2[3] | F3[4] |
| | B1[3] | F2[6] | B3[4] |
| B0[3] | | B2[4] | F3[5] |
| | B1[4] | F2[7] | B3[5] |
| B0[4] | | B2[5] | F3[6] |
| | B1[6] | | B3[6] |
| B0[5] | | B2[6] | F3[7] |
| | B1[6] | | B3[7] |
| B0[6] | | B2[7] | |
| | B1[7] | | |
| B0[7] | | | |

600

700

METHOD AND APPARATUS FOR PIPELINE PARALLELISM COMPILING

CROSS-REFERENCE TO RELATED APPLICATION

This application claims priority under 35 U.S.C § 119 to Korean Patent Application No. 10-2023-0029483 and No. 10-2023-0087162, filed in the Korean Intellectual Property Office on Mar. 6, 2023 and Jul. 5, 2023, respectively, the entire contents of which are hereby incorporated by reference.

BACKGROUND

Technical Field

The present disclosure relates to a method and apparatus for pipeline parallelism compiling, and specifically, to a method and apparatus for parallel processing a plurality of operation sets corresponding to a plurality of operation groups including operations executed on training data of a machine learning model based on a source program for each of a plurality of micro-batches generated from the training data.

Description of the Related Art

A compiler is a language translation program that converts codes written in a specific programming language into another language (e.g., machine language) that can be read by a computer processor. A general compiler performs the process of converting a specific programming language into another language by sequentially analyzing the vocabulary, syntax, and semantics of a source program, generating an intermediate representation such as intermediate code, optimizing the code, and then generating an object code. In the field of compiler technology, technological advances have been made to improve the speed and efficiency of target programs by optimizing this conversion process.

Meanwhile, training deep learning models requires considerable computing resources. Parallel computing technology is widely used to overcome the limitations in terms of data processing speed and available memory when training a model on a single device. The parallel computing is a computing method in which multiple processing units participate in problem solving at the same time to quickly complete a given task, and is widely used in various fields (e.g., machine learning, image processing, etc.) that require high-performance computing, complex problem solving, and large amount of data processing, and is attracting attention as one of the most powerful paradigms in computer architecture.

However, in the existing general techniques used in pytorch and the like to train models according to parallel computing, additional efforts are required during programming, such as requiring the user to directly determine each stage or micro-batch of the pipeline and explicitly inserting a communication process between devices. The library or the like may be used to reduce such effort, but there still is inconvenience that the user has to perform additional settings in consideration of the current system.

SUMMARY

In order to solve the problems described above, the present disclosure provides a method, recording medium, and system (apparatus) for pipeline parallelism compiling.

The present disclosure may be implemented in a variety of ways, including a method, a system (device), or a computer program stored in a readable storage medium.

A method for pipeline parallelism compiling is provided, which may be executed by one or more processors and include receiving a source program associated with training of a machine learning model, determining, based on the source program, a plurality of operation groups including operations executed on training data of the machine learning model, generating a plurality of micro-batches from the training data, and determining, for each of the plurality of micro-batches, a plurality of operation sets corresponding to the plurality of operation groups.

The method may further include determining an accelerator allocated with each of the plurality of operation sets and a processing sequence thereof such that each of the plurality of operation sets is processed in one of a plurality of accelerators.

The plurality of operation groups may include one or more forward propagation operation groups associated with a forward propagation process of the training data, and one or more backward propagation operation groups associated with a backward propagation process, and the plurality of operation sets may include one or more forward propagation operation sets associated with the one or more forward propagation operation groups, and one or more backward propagation operation sets associated with the one or more backward propagation operation groups.

The determining the accelerator allocated with each of the plurality of operation sets and the processing sequence thereof may include determining that each of a plurality of forward propagation operation sets associated with a specific micro-batch be sequentially processed in different accelerators from each other.

The determining the accelerator allocated with each of the plurality of operation sets and the processing sequence thereof may further include determining that each of a plurality of backward propagation operation sets associated with the specific micro-batch be sequentially processed in a reverse order to the order of an accelerator in which the plurality of forward propagation operation sets associated with the specific micro-batch are sequentially processed.

The determining the accelerator allocated with each of the plurality of operation sets and the processing sequence thereof may further include determining that processing of the plurality of backward propagation operation sets associated with the specific micro-batch start immediately after processing of each of the plurality of forward propagation operation sets associated with the specific micro-batch is completed.

The determining the accelerator allocated with each of the plurality of operation sets and the processing sequence thereof may include determining that the forward propagation operation sets and the backward propagation operation sets associated with the plurality of micro-batches be processed to cross each other a maximum number of times in the plurality of accelerators.

The determining the plurality of operation groups may include determining a plurality of processing times in the plurality of operation groups for a same training data, and determining the plurality of operation groups such that a difference between each of the determined plurality of processing times is less than a first predetermined threshold value.

The generating the plurality of micro-batches may include determining a plurality of processing times in a plurality of operation sets associated with the plurality of micro-batches, and generating the plurality of micro-batches such that the difference between each of the determined plurality of processing times is less than a second predetermined threshold value.

There is provided a computer-readable non-transitory recording medium storing instructions for executing the method described above on a computer.

According to an embodiment of the present disclosure, an apparatus is provided, which may include a communication module, a memory, and one or more processors connected to the memory and configured to execute at least one computer-readable program included in the memory, in which the one or more programs may further include instructions for receiving a source program associated with training of a machine learning model, determining, based on the source program, a plurality of operation groups including operations executed on training data of the machine learning model, generating a plurality of micro-batches from the training data, and determining, for each of the plurality of micro-batches, a plurality of operation sets corresponding to the plurality of operation groups.

According to various examples of the present disclosure, the accelerator allocated with each of a plurality of operation sets and the processing sequence thereof are determined by a compiler without requiring additional programming such as requiring a user to directly select each stage of the pipeline or micro-batch, such that the pipeline parallelism compiling process can be performed efficiently.

According to various examples of the present disclosure, the processing time of each of the operation sets is similar to each other, so that the performance (processing speed and throughput) of the pipelined parallel processing can be improved.

According to various examples of the present disclosure, by determining that the forward propagation operation set and the backward propagation operation set be processed to cross each other the maximum number of times, the live range of an activation tensor associated with the processing of micro-batches is shortened, such that the activation tensor is vanished more quickly in a plurality of accelerators.

According to various examples of the present disclosure, As the activation tensor quickly is vanished, the memory usage for the activation tensor is reduced, and so free memory space is ensured, whereby a model with a larger size can be processed in the accelerator or a batch or operation sets with a larger size can be processed in parallel.

The effects of the present disclosure are not limited to the effects described above, and other effects not described herein can be clearly understood by those of ordinary skill in the art (hereinafter referred to as "ordinary technician") from the description of the claims.

BRIEF DESCRIPTION OF THE DRAWINGS

The above and other objects, features and advantages of the present disclosure will be described with reference to the accompanying drawings described below, where similar reference numerals indicate similar elements, but not limited thereto, in which:

FIG. 4 illustrates an example of accelerators allocated with each of a plurality of operation sets, and a processing sequence;

FIG. 5 illustrates an example in which a processing sequence of a plurality of operation sets is rearranged;

DETAILED DESCRIPTION

Figure 1:
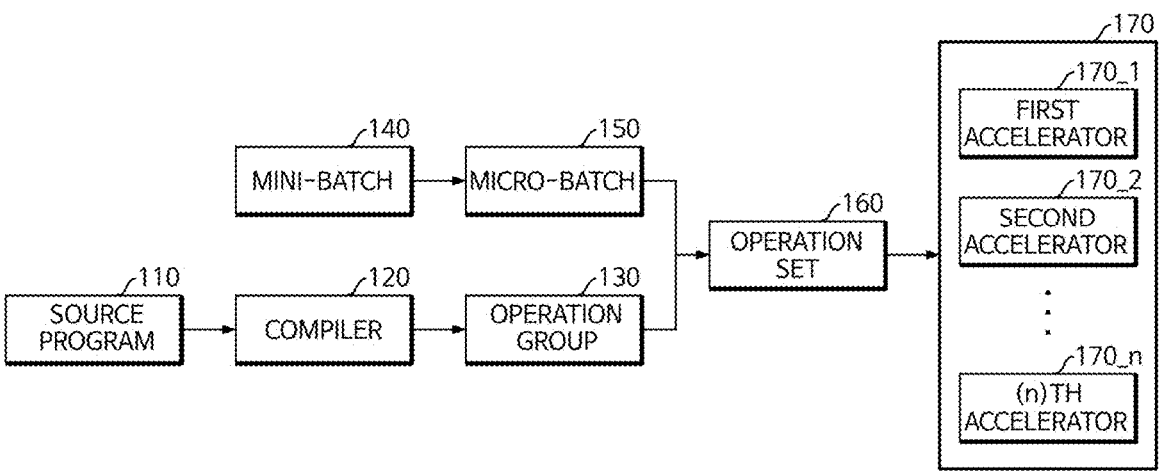
FIG. 1 illustrates an example in which a plurality of operation sets determined from a plurality of micro-batches and a plurality of operation groups are allocated to an accelerator set.

Hereinafter, example details for the practice of the present disclosure will be described in detail with reference to the accompanying drawings. However, in the following description, detailed descriptions of well-known functions or configurations will be omitted if it may make the subject matter of the present disclosure rather unclear.

In the accompanying drawings, the same or corresponding components are assigned the same reference numerals. In addition, in the following description of various examples, duplicate descriptions of the same or corresponding components may be omitted. However, even if descriptions of components are omitted, it is not intended that such components are not included in any example.

Advantages and features of the disclosed examples and methods of accomplishing the same will be apparent by referring to examples described below in connection with the accompanying drawings. However, the present disclosure is not limited to the examples disclosed below, and may be implemented in various forms different from each other, and the examples are merely provided to make the present disclosure complete, and to fully disclose the scope of the disclosure to those skilled in the art to which the present disclosure pertains.

The terms used herein will be briefly described prior to describing the disclosed example(s) in detail. The terms used herein have been selected as general terms which are widely used at present in consideration of the functions of the present disclosure, and this may be altered according to the intent of an operator skilled in the art, related practice, or introduction of new technology. In addition, in specific cases, certain terms may be arbitrarily selected by the applicant, and the meaning of the terms will be described in detail in a corresponding description of the example(s). Therefore, the terms used in the present disclosure should be defined based on the meaning of the terms and the overall content of the present disclosure rather than a simple name of each of the terms.

As used herein, the singular forms "a," "an," and "the" are intended to include the plural forms as well, unless the context clearly indicates the singular forms. Further, the plural forms are intended to include the singular forms as well, unless the context clearly indicates the plural forms. Further, throughout the description, when a portion is stated as "comprising (including)" a component, it is intended as meaning that the portion may additionally comprise (or include or have) another component, rather than excluding the same, unless specified to the contrary.

Further, the term "module" or "unit" used herein refers to a software or hardware component, and "module" or "unit"

performs certain roles. However, the meaning of the "module" or "unit" is not limited to software or hardware. The "module" or "unit" may be configured to be in an addressable storage medium or configured to play one or more processors. Accordingly, as an example, the "module" or "unit" may include components such as software components, object-oriented software components, class components, and task components, and at least one of processes, functions, attributes, procedures, subroutines, program code segments, drivers, firmware, micro-codes, circuits, data, database, data structures, tables, arrays, and variables. Furthermore, functions provided in the components and the "modules" or "units" may be combined into a smaller number of components and "modules" or "units", or further divided into additional components and "modules" or "units."

The "module" or "unit" may be implemented as a processor and a memory. The "processor" should be interpreted broadly to encompass a general-purpose processor, a central processing unit (CPU), a microprocessor, a digital signal processor (DSP), a controller, a microcontroller, a state machine, and so forth. Under some circumstances, the "processor" may refer to an application-specific integrated circuit (ASIC), a programmable logic device (PLD), a field-programmable gate array (FPGA), and so on. The "processor" may refer to a combination for processing devices, e.g., a combination of a DSP and a microprocessor, a combination of a plurality of microprocessors, a combination of one or more microprocessors in conjunction with a DSP core, or any other combination of such configurations. In addition, the "memory" should be interpreted broadly to encompass any electronic component that is capable of storing electronic information. The "memory" may refer to various types of processor-readable media such as random access memory (RAM), read-only memory (ROM), non-volatile random access memory (NVRAM), programmable read-only memory (PROM), erasable programmable read-only memory (EPROM), electrically erasable PROM (EEPROM), flash memory, magnetic or optical data storage, registers, and so on. The memory is said to be in electronic communication with a processor if the processor can read information from and/or write information to the memory. The memory integrated with the processor is in electronic communication with the processor.

In the present disclosure, a "node" may refer to a device or component that participates in operation, communication, resource management, etc. of a system within a network or system that performs a specific task or function. For example, the node may include physical servers, virtual machines, storage devices, network switches, routers, or other computing elements which are interconnected to each other and work together to provide services, to share resources, to process data, etc.

In the present disclosure, a "source program" may refer to a collection of instructions written in a programming language designed to perform a specific task. For example, the source program may be written to perform a deep learning task, and the referenced data may be implemented with any data type (e.g., tensor type data, etc.) that may form a deep learning program. The source program may form the original and primary output of the programming process and may be converted into machine code through a compilation process or interpreted directly at run time. The source program may be written across multiple files and may include code libraries and dependencies.

In the present disclosure, a "mini-batch" may refer to a subset of the training data, which is generated by dividing an entire dataset used for machine learning. For example, the mini-batch may be used for computing gradients and updating parameters of the model at each step of mini-batch gradient descent which is a variant of stochastic gradient descent.

In the present disclosure, a "micro-batch" may refer to a subset of the mini-batch, which is generated by dividing the mini-batch. For example, the micro-batch may be created by dividing the mini-batch by the number of accelerator sets participating in the operation. For example, if 64 accelerators participate in the operation, and the 64 accelerators are classified into 16 accelerator groups with 4 accelerators per group, the mini-batch may be divided into 16 micro-batches.

In this disclosure, the "accelerator" may refer to any processor or circuitry that performs calculations. For example, the accelerator may refer to a processor or circuitry capable of performing calculations quickly, and may include a graphics processing unit (GPU), a neural processing unit (NPU), a tensor processing unit (TPU), etc., for example, but not limited thereto. In addition, the "accelerator" may refer to an accelerator group including a plurality of accelerators unless the context clearly specifies that it is one accelerator. For example, the "accelerator" may refer to a GPU group including 4 GPUs.

In the present disclosure, an "activation tensor" may refer to a tensor used for storing an intermediate value of a neural network during forward propagation and backward propagation processes in the neural network. For example, the activation tensor may store activations which are outputs of nonlinear activation functions applied to inputs or outputs of various layers of the network, and when a backward propagation process corresponding to one forward propagation process is processed, the activation tensor associated with the corresponding forward propagation process may be vanished.

In the present disclosure, a "live range" may refer to a time during which the activation tensor should be used for operation etc. or stored in a memory for subsequent operation etc. For example, the live range may start when the activation tensor is first generated (e.g., when an activation function is applied to the layer's inputs or outputs), and may end when the activation tensor is no longer needed for subsequent computations (e.g., when the backward pass for the corresponding particular layer is completed).

In the present disclosure, an "operation group" may refer to a set or unit including a plurality of operations to process any training data in an artificial neural network of a machine learning model. For example, the operation group may be determined by classifying and dividing all operations processed in the training process of the artificial neural network.

In the present disclosure, the "operation set" may refer to a set or unit including operations for applying all operations included in one operation group to one micro-batch.

FIG. 1 illustrates an example in which a plurality of operation sets 160 determined from a plurality of micro-batches 150 and a plurality of operation groups 130 are allocated to an accelerator set 170.

A compiler 120 may generate a plurality of operation groups 130 based on a source program 110. For example, an intermediate expression may be first determined in the compiler 120, and the determined intermediate expression may be translated into an object code for a specific machine, thereby determining the plurality of operation groups 130 including operations performed on the training data of a machine learning model to be executed in the accelerator set 170.

The plurality of operation groups 130 may be determined by classifying and dividing all operations processed in the training process of the artificial neural network. For example, the plurality of operation groups 130 may include a forward propagation operation group including operations associated with at least a part of the forward propagation process of training data in the artificial neural network and a backward propagation operation group including operations associated with at least a part of the backward propagation process.

The number of forward propagation operation groups and the number of backward propagation operation groups may be equal to the number of accelerators (or to the number of accelerator groups) to be allocated with the plurality of operation sets 160. For example, in FIG. 1, since the plurality of operation sets 160 are allocated to the accelerator set 170 including (n) accelerators 170_1 to 170_n (or (n) accelerator groups each including a plurality of accelerators), all operations associated with the forward propagation process are divided into (n) forward propagation operation groups, and all operations associated with the backward propagation process are divided into (n) backward propagation operation groups, resulting in a total of (2n) operation groups.

Meanwhile, a mini-batch 140 may be generated from the training data for training the artificial neural network. The mini-batch 140 may be generated by dividing the training data into a certain number by the compiler 120, etc. Each mini-batch 140 may include a plurality of training samples. In this case, the training sample may refer to a minimum unit of training data for training the artificial neural network. For example, in the case of an artificial neural network associated with image processing, the training sample may be a single image.

A plurality of micro-batches 150 may be generated as the mini-batch 140 is divided into a predetermined number by the compiler 120. That is, each of the plurality of micro-batches 150 may include at least some of the plurality of training samples included in the mini-batch 140. For example, if a mini-batch including 128 training samples is divided into 8 micro-batches, each of the 8 micro-batches may include 16 training samples.

The number of divisions from the mini-batches 140 (or the number of micro-batches 150 generated from the mini-batches 140) may be adjusted for each iteration of the target program or determined based on a cost model. For example, for each iteration of the target program, the number of divisions may be adjusted based on the processing speed, memory usage, etc. of the target program in each iteration. Details of the method for dividing the mini-batch 140 into a plurality of micro-batches 150 based on the cost model will be described below with reference to FIG. 8.

A plurality of operation sets 160 corresponding to the plurality of operation groups 130 may be determined based on the plurality of operation groups 130 and the plurality of micro-batches 150. For example, the plurality of operation sets 160 may include one or more forward propagation operation sets associated with one or more forward propagation operation groups and one or more backward propagation operation sets associated with one or more backward propagation operation groups.

Each of the plurality of operation sets 160 may include an operation for applying all operations included in any one of the plurality of operation groups 130 to any one of the plurality of micro-batches 150. That is, the operation group 130 may be a set of operations to be processed for the entire training data, and the operation set 160 may be a set of operations for actually applying the operations in the operation group 130 to at least a part (or micro-batch) of the training data.

The plurality of operation sets 160 may be allocated to the accelerator set 170 (or to accelerators 170_1 to 170_n in the accelerator set 170). The accelerators 170_1 to 170_n may refer to any accelerator that performs processing of the plurality of operation sets 160, etc., and may be a graphics processing unit (GPU), a neural processing unit (NPU), a tensor processing unit (TPU), a core included in a processing unit, an accelerator group including a plurality of accelerators, a node, etc., but is not limited thereto.

Each of the accelerators 170_1 to 170_n does not necessarily correspond to the same type of accelerator. For example, the accelerator set 170 may correspond to a heterogeneous computing system and may include different types of processors such as GPUs or TPUs.

When each of the accelerators 170_1 to 170_n refers to an accelerator group including a plurality of accelerators, each of the plurality of operation sets 160 may be parallelized and processed by a plurality of accelerators in the accelerator group. That is, in this case, each of the plurality of operation sets 160 may be allocated to one of the plurality of accelerator groups and then parallelly processed by the plurality of accelerators in the allocated accelerator group. The number of accelerators in the accelerator group (or how many accelerator groups into which the accelerator set 170 is to be divided) may be determined according to the number of efficient pipeline stages.

The accelerator to be allocated with each of the plurality of operation sets 160 and the processing sequence thereof may be determined such that each of the plurality of operation sets 160 is processed in one of the plurality of accelerators 170_1 to 170_n. In this case, the accelerator allocated with each of the plurality of operation sets 160 and the processing sequence thereof may be determined by the compiler 120. This will be described below in detail with reference to FIGS. 4 and 5.

Figure 2:
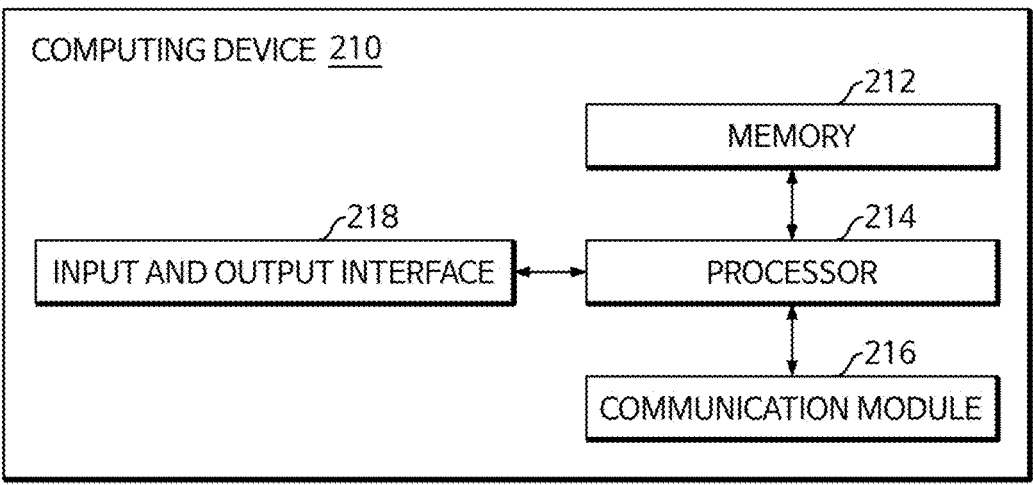
FIG. 2 is a block diagram of an internal configuration of a computing device.

FIG. 2 is a block diagram of an internal configuration of a computing device 210. The computing device 210 may include a memory 212, a processor 214, a communication module 216, and an input and output interface 218. As illustrated in FIG. 2, the computing device 210 may be configured to communicate information, data, etc. through a network by using the communication module 216.

The computing device 210 may correspond to a user terminal or an information processing system, and it may be configured such that one of the user terminal or the information processing system is able to communicate information, data, etc. with the other via a network using the communication module 216.

The memory 212 may include any non-transitory computer-readable recording medium. The memory 212 may include a permanent mass storage device such as random access memory (RAM), read only memory (ROM), disk drive, solid state drive (SSD), flash memory, and so on. As another example, a non-destructive mass storage device such as ROM, SSD, flash memory, disk drive, and the like may be included in the computing device 210 as a separate permanent storage device that is separate from the memory. In addition, an operating system and at least one program code may be stored in the memory 212.

These software components may be loaded from a computer-readable recording medium separate from the memory 212. Such a separate computer-readable recording medium may include a recording medium directly connectable to the computing device 210, and may include a computer-readable recording medium such as a floppy drive, a disk, a tape, a DVD/CD-ROM drive, a memory card, and the like, for example. In another example, the software components may be loaded into the memory 212 through the communication module 216 rather than the computer-readable recording medium. For example, at least one program may be loaded into the memories 212 based on a computer program installed by files provided by developers or a file distribution system that distributes an installation file of an application through the communication module 216.

The processor 214 may be configured to process the commands of the computer program by performing basic arithmetic, logic, and input and output computations. The commands may be provided to a user terminal (not illustrated) or another external system by the memory 212 or the communication module 216. In addition, the processor 214 may be configured to manage, process, and/or store the information and/or data received from a plurality of user terminals and/or a plurality of external systems.

The processor 214 may be a processor on which a compiler operates. The processor 214 may determine a plurality of operation groups including operations executed on the training data of the machine learning model based on the source program, and generate a plurality of micro-batches from the training data. The processor 214 may determine, for each of a plurality of micro-batches, a plurality of operation sets corresponding to a plurality of operation groups, and determine the accelerator to be allocated with each of the plurality of operation sets and the processing sequence thereof such that each of the plurality of operation sets is processed in any one of the plurality of accelerators.

The communication module 216 may provide a configuration or function for the user terminal (not illustrated) and the computing device 210 to communicate with each other through a network, and may provide a configuration or function for the computing device 210 to communicate with an external system (e.g., a separate cloud system). For example, control signals, commands, data, etc. provided under the control of the processor 214 of the computing device 210 may be transmitted to the user terminal, the external system (e.g., a parallel computing system), etc. through the communication module 216 and the network through the communication module of the user terminal, external system, etc.

In addition, the input and output interface 218 of the computing device 210 may serve as a means for interfacing with a device (not illustrated) for input or output which may be connected to or included in the computing device 210. In FIG. 2, the input and output interface 218 is illustrated as a component configured separately from the processor 214, but aspects are not limited thereto, and the input and output interface 218 may be configured to be included in the processor 214.

The computing device 210 may receive a source program from a user (user terminal) through the input and output interface 218. Alternatively, the computing device 210 may also receive the source program through the communication module 216.

The computing device 210 may include more components than those illustrated in FIG. 2. Meanwhile, most of the related components may not necessarily require exact illustration.

Figure 3:
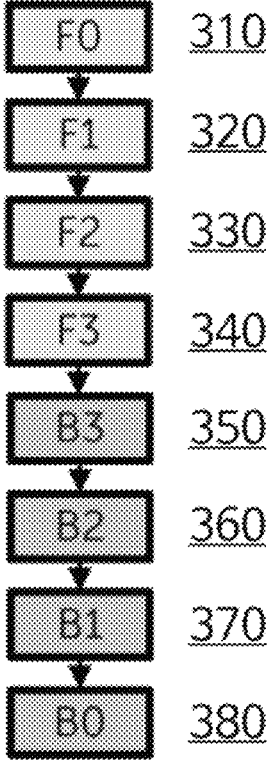
FIG. 3 illustrates an example of an operation group.

FIG. 3 illustrates examples of operation groups 310, 320, 330, 340, 350, 360, 370, and 380.

Each of the first operation group 310, the second operation group 320, the third operation group 330, and the fourth operation group 340 associated with the forward propagation process may be generated by dividing an operation associated with the forward propagation process determined based on the source program into a predetermined number of groups.

Likewise, each of the fifth operation group 350, the sixth operation group 360, the seventh operation group 370, and the eighth operation group 380 associated with the backward propagation process may be generated by dividing an operation associated with the backward propagation process determined based on the source program into a predetermined number of groups.

The number of forward propagation operation groups and the number of backward propagation operation groups may be the same as the number of accelerators that are used (or allocated with micro-batches) when training the artificial neural network. In this case, the accelerators that are used when training the artificial neural network may refer to an accelerator group including a plurality of accelerators.

For example, in FIG. 3, as a result of allocating micro-batches to four accelerators (or accelerator group), four operation groups 310, 320, 330, and 340 associated with the forward propagation process and four operation groups 350, 360, 370, and 380 associated with the backward propagation process may be generated.

The plurality of operation groups 310 to 380 may be divided such that a difference between each of the plurality of processing times of the plurality of operation groups 310 to 380 for the same training data is less than a threshold value. That is, if a threshold value is set small enough, the processing time of each of the plurality of operation groups 310 to 380 for the same training data may be substantially the same as each other. The threshold value between processing times is set as time (e.g., 1 ms), or may be set in various ways, such as being set as a ratio of a processing time of a specific operation group (e.g., $\frac{1}{10}$ of the processing time of the first operation group 310) or a ratio to an average processing time of all operation groups.

Figure 4:
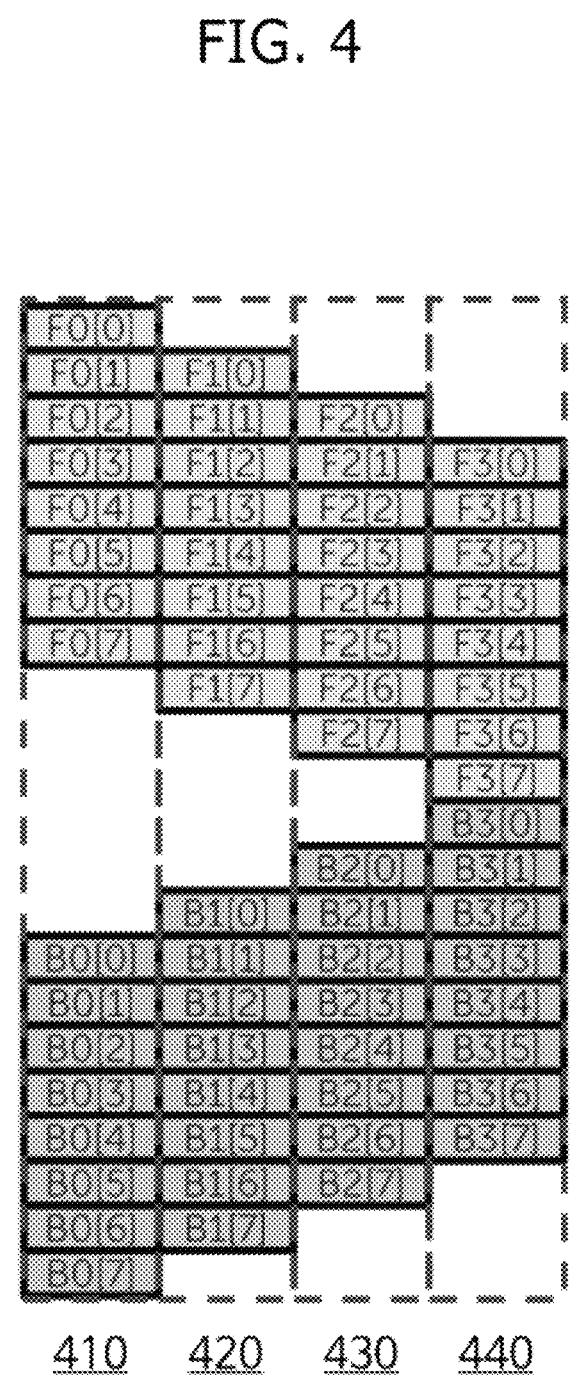

FIG. 4 illustrates an example of accelerators allocated with each of a plurality of operation sets, and the processing sequence.

Each of the boxes shown in FIG. 4 (e.g., F0(0), F0(1), etc.) represents an operation set that performs all operations included in any one of the operation groups 310 to 380 of FIG. 3 for any one micro-batch. For example, "F0(1)" may refer to an operation set applying all operations included in the first operation group 310 F0 of FIG. 3 to micro-batch "1". The plurality of operation sets shown in FIG. 4 may include forward propagation operation sets associated with the forward propagation operation groups 310, 320, 330, and 340 and backward propagation operation sets associated with the back propagation operation groups 350, 360, 370, and 380 in FIG. 3.

The height of the box may represent the processing time of the operation set corresponding to the box, and the operation sets may be sequentially processed from the top to the bottom of areas 410, 420, 430, and 440. Each of the areas 410, 420, 430, and 440 represents the processing areas of the first accelerator, the second accelerator, the third accelerator, and the fourth accelerator, and the operation sets corresponding to the boxes placed in one area indicates that the operation sets are processed by the accelerator corresponding to the area. For example, first, the F0(0) operation set may be processed in the first accelerator, and then the processing of the F0(1) operation set and the F1(0) operation set may start together in the first accelerator and the second accelerator, respectively, and then end. In this case, the accelerator may refer to an accelerator group including a plurality of accelerators, and each of the operation sets may be parallelly processed in a plurality of accelerators in the accelerator group. For example, each of the areas 410, 420, 430, and 440 may represent the processing areas of the first accelerator group, the second accelerator group, the third accelerator group, and the fourth accelerator group.

A plurality of micro-batches are generated such that a difference between each of the plurality of processing times in the plurality of operation sets is less than a predetermined threshold value, so that the plurality of operation sets associated with the plurality of micro-batches may be generated. That is, if the threshold value is set small enough, the operation sets can be divided such that the processing time of all operation sets is substantially the same as each other. With this configuration, the operation sets are divided such that the processing time of each of the operation sets is substantially the same as each other, so that the operation sets are efficiently parallel-processed and the performance of pipeline parallelism compiling can be improved.

The threshold value between processing times may be set as time (e.g., 1 ms), or may be set in various ways, such as being set as a ratio of a processing time of a specific operation set (e.g., ¹⁄₁₀ of the processing time of the F0(0) operation set) or a ratio to an average processing time of all operation sets.

One mini-batch (or a plurality of micro-batches generated by dividing one mini-batch) and a plurality of operation sets associated with any one of the operation groups may be allocated to be sequentially processed in one accelerator. For example, as shown in FIG. 4, one mini-batch may be divided into micro-batches "0" to "8", and eight forward propagation operation sets F0(0), F0(1), F0(2), F0(3), F0(4), F0(5), F0(6), F0(7) associated with the F0 operation group may be processed in order from F0(0) to F0(7), and eight backward propagation operation sets B0(0), B0(1), B0(2), B0(3), B0(4), B0(5), B0(6), and B0(7) may be processed in the order of B0(0) to B0(7) in the first accelerator.

Each of a plurality of forward propagation operation sets associated with a specific micro-batch may be determined so as to be sequentially processed in different accelerators. For example, in a plurality of forward propagation operation sets F0(0), F1(0), F2(0), F3(0) associated with micro-batch "0", any one operation set may be processed in the order of the first accelerator, the second accelerator, the third accelerator, and the fourth accelerator, and then the processing result may be passed to the next accelerator and the next operation sets may be processed sequentially.

Each of the plurality of backward propagation operation sets associated with the same micro-batch may be determined so as to be sequentially processed in a reverse order to the order of the accelerator in which the plurality of forward propagation operation sets associated with the specific micro-batch are sequentially processed. For example, in a plurality of backward propagation operation sets (B0(0), B1(0), B2(0), B3(0)) associated with micro-batch "0", any one operation sets may be processed in the order of the fourth accelerator, the third accelerator, the second accelerator, and the first accelerator, which are in the reverse order to the order in which each of the plurality of forward propagation operation sets F0 (0), F1 (0), F2 (0), and F3 (0) associated with the micro-batch "0" is processed, and then the processing result may be passed to the next accelerator and the next operation sets may be processed sequentially.

FIG. 5 illustrates an example in which the processing sequence of a plurality of operation sets is rearranged. The processing sequence of the plurality of operation sets of FIG.

5 may be rearranged from the processing sequence of the plurality of operation sets illustrated and described in FIG. 4. Areas 510, 520, 530, and 540 of FIG. 5 correspond to the areas 410, 420, 430, and 440 of FIG. 4, and descriptions of the same areas and operation sets as those described above in FIG. 4 are omitted.

The processing sequence may be rearranged such that processing of the plurality of backward propagation operation sets associated with the specific micro-batch starts immediately after processing of each of a plurality of forward propagation operation sets associated with a specific micro-batch is completed. That is, immediately after each of the plurality of forward propagation operation sets associated with a specific micro-batch is processed, the processing of the backward propagation operation set associated with the corresponding micro-batch may start in the accelerator where the last forward propagation operation set was processed, and no other operation set may be processed in the corresponding accelerator before processing of the backward propagation operation set starts.

For example, unlike the example in FIG. 4 in which the backward propagation operation sets are processed after all forward propagation operation sets are processed, in FIG. 5, immediately after processing of a plurality of forward propagation operation sets (e.g., F0(0), F1(0), F2(0), and F3(0)) associated with a specific micro-batch is completed, processing of a plurality of corresponding backward propagation operation sets (e.g., B0(0), B1(0), B2(0) and B3(0)) may start. That is, it may be determined such that, in response to a plurality of backward propagation operation sets associated with a specific micro-batch being placed in an executable state, processing of the corresponding backward propagation operation set may immediately start.

With this configuration, since the backward propagation operation set is immediately processed, the live range of an activation tensor used to store an intermediate value of the neural network during forward propagation and backward propagation may be reduced, thereby reducing memory usage.

As shown in FIG. 5, the processing sequence of each of the plurality of operation sets may be determined such that the forward propagation operation set and the backward propagation operation set cross each other the maximum number of times in the plurality of accelerators. That is, the processing sequence of the plurality of operation sets shown in FIG. 5 may correspond to the processing sequence in which all forward propagation operation sets and all backward propagation operation sets cross each other the maximum number of times while satisfying the conditions described above with reference to FIG. 5.

With this configuration, the live range of the entire activation tensor associated with micro-batch processing is shortened, so the activation tensor may be vanished more quickly, and the memory usage by the activation tensor is reduced, thereby increasing a free memory space. As the memory free space increases, larger size models (e.g., models with more parameters) may be processed in the accelerator or larger size batches may be processed in parallel (throughput improvement).

The process shown and described in FIGS. 4 and 5, which determines the accelerator to be allocated with each of the plurality of operation sets and the processing sequence thereof may be executed by a compiler.

Figure 6:
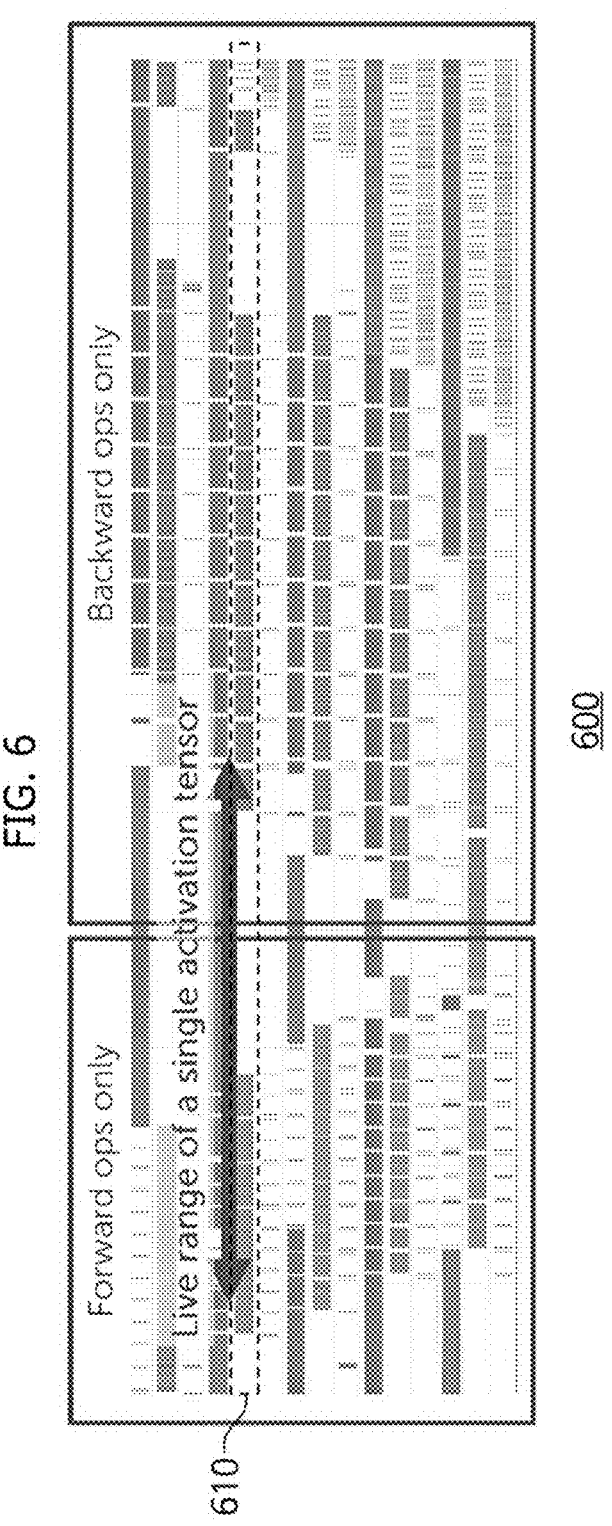
FIG. 6 illustrates an example of an execution timeline of an accelerator when there is no rearrangement of a plurality of operation sets.
Figure 7:
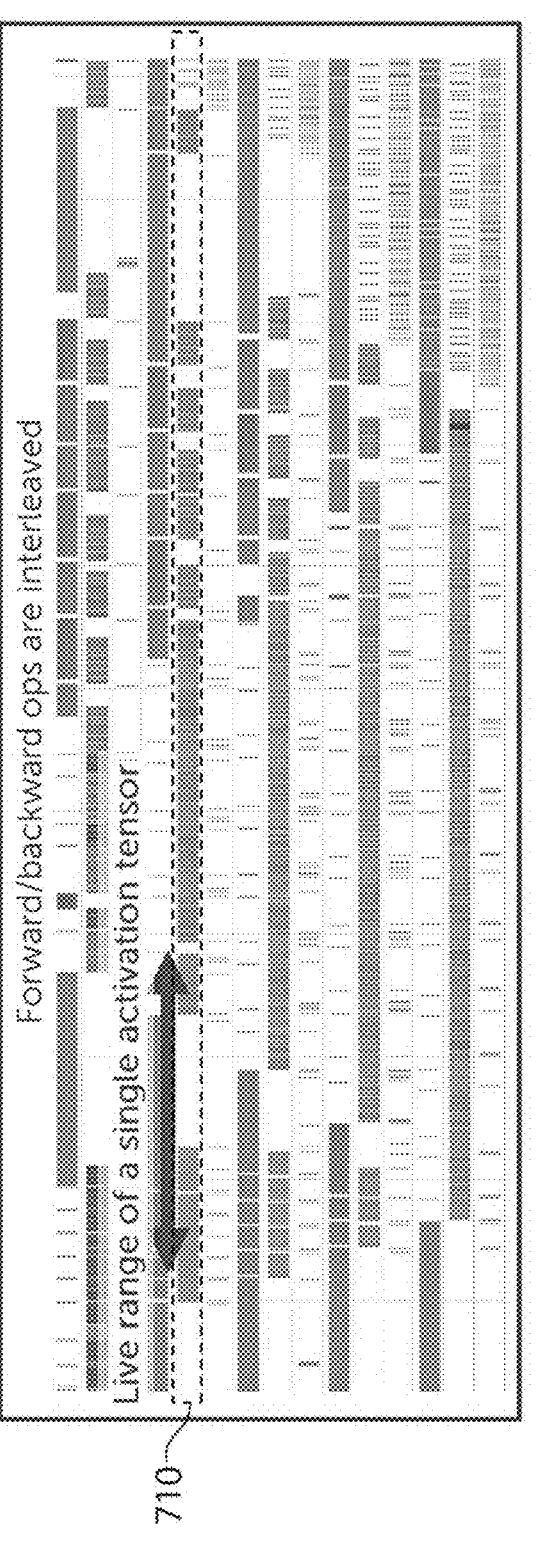
FIG. 7 illustrates an example of an execution timeline of an accelerator when there is a rearrangement of a plurality of operation sets.

FIG. 6 illustrates an example of an execution timeline 600 of an accelerator when there is no rearrangement of a plurality of operation sets, and FIG. 7 illustrates an example of an execution timeline 700 of an accelerator when there is a rearrangement of a plurality of operation sets.

That is, the execution timeline 600 of FIG. 6 may show an execution timeline of the accelerator according to the accelerator allocated with each of the plurality of operation sets shown in FIG. 4 and the processing sequence, and the execution timeline 700 of FIG. 7 may show an execution timeline of the accelerator according to the accelerator allocated with each of the plurality of operation sets shown in FIG. 5 and the processing sequence. In this case, the accelerator may refer to an accelerator group including a plurality of accelerators, and the timelines 600 and 700 may be the execution timelines of each accelerator group.

Each of the execution timelines 600 and 700 may be a visual representation of the degree of use or occupancy of the accelerator over time in a parallel or distributed computing system. With this configuration, the degree of resource utilization, inactive period of the system, etc. may be easily identified.

The horizontal axis of each of the execution timelines 600 and 700 represents time, and the vertical axis thereof may represent various accelerators, cores, etc. of the system. A bar or line is drawn along the time axis to indicate period of time in which the accelerator is active or performing a task, and the length of the bar may represent the task period.

Compared with the live range of the activation tensor associated with the micro-batch processing in the specific area 610 of FIG. 6, in the area 710 of FIG. 7 corresponding to the area 610 of FIG. 6, it can be seen that the live range of the activation tensor associated with micro-batch processing is shorter.

That is, the accelerator allocated with each of the plurality of operation sets and processing sequence thereof may be determined such that the forward propagation operation set and the backward propagation operation set cross each other the maximum number of times, so that the activation tensor can be more quickly vanished, thereby increasing a free memory space.

Figure 8:
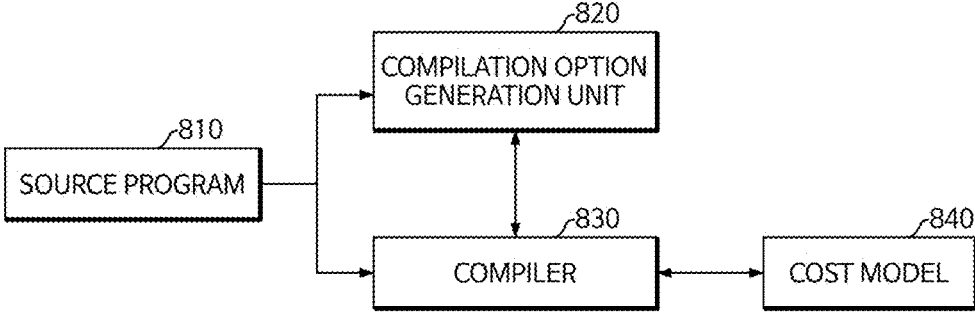
FIG. 8 illustrates an example of determining a cost model.

FIG. 8 illustrates an example of determining a cost model 840.

A source program 810 may be a collection of instructions written in a programming language designed to perform a specific task. For example, the source program 810 may be a source graph in which a collection of instructions designed to perform a specific task is expressed in a graph form.

A compilation option generation unit 820 may determine the number of divisions of mini-batch (the number of micro-batches generated for each mini-batch) based on the source program 810. For example, the compilation option generation unit 820 may increase the number of divisions from 1 to a predetermined number for each iteration.

A compiler 830 may generate a plurality of micro-batches based on the number of divisions of mini-batch determined by the compilation option generation unit 820. The compiler 830 may calculate memory usage (e.g., memory usage of the activation tensor, etc.) associated with the target program, mini-batch, micro-batch, etc.

The cost model 840 may determine an expected processing time of a target program, mini-batches, micro-batches, etc. according to the number of divisions of mini-batch based on the information calculated by the compiler 830.

The compiler 830 may determine the final number of divisions of the mini-batch based on the expected processing time determined in the cost model 840.

For example, the compiler 830 may determine, as the final number of divisions of the mini-batch, the number of divisions of mini-batch when the expected processing time of the target program is the shortest, and divide each mini-batch by the final number of divisions to generate micro-batches. With this configuration, the optimal number of divisions of mini-batch can be determined.

Figure 9:
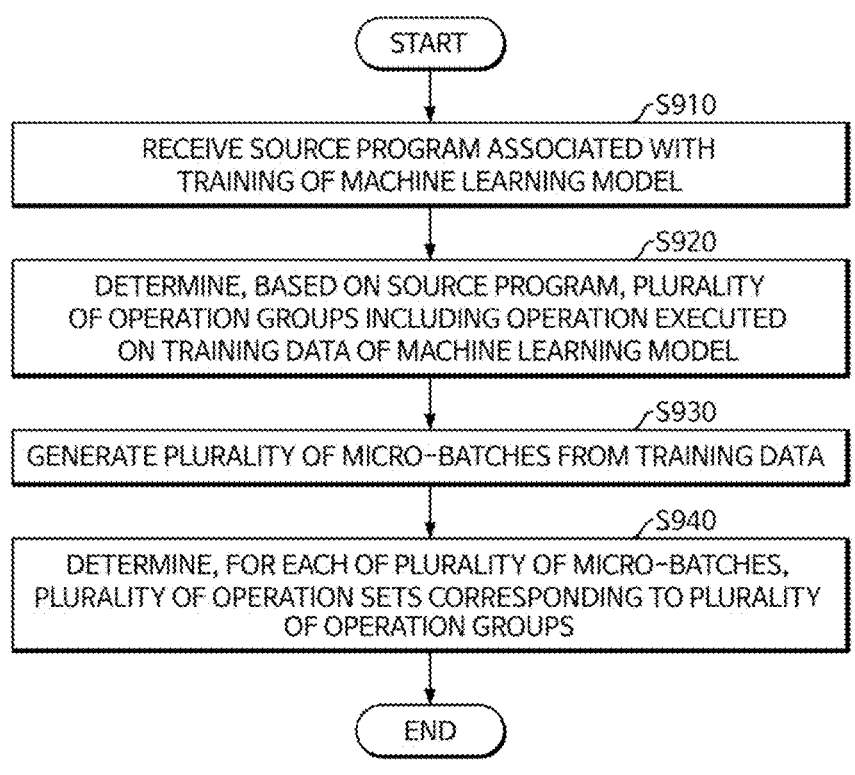
FIG. 9 is a flowchart illustrating a method for pipeline parallelism compiling.

FIG. 9 is a flowchart illustrating a method 900 for pipeline parallelism compiling.

The method 900 for pipeline parallelism compiling may be executed by a processor (e.g., one or more processors of a user terminal or a computing device such as an information processing system). The method 900 for pipeline parallelism compiling may be executed by a compiler (or a processor for compilation).

The method 900 for pipeline parallelism compiling may be initiated by the processor receiving a source program, at S910.

The processor may determine a plurality of operation groups including operations executed on training data of the machine learning model based on the source program, at S920. In this case, the plurality of operation groups may include one or more forward propagation operation groups associated with the forward propagation process of the training data and one or more backward propagation operation groups associated with the backward propagation process.

The processor may determine a plurality of processing times in a plurality of operation groups for the same training data, and determine a plurality of operation groups such that a difference between each of the determined plurality of processing times is less than a first predetermined threshold value.

The processor may generate a plurality of micro-batches from the training data, at S930. The processor may determine a plurality of processing times in a plurality of operation sets associated with the plurality of micro-batches, and may generate a plurality of micro-batches such that a difference between each of the plurality of determined processing times is less than a second predetermined threshold value.

The processor may determine, for each of a plurality of micro-batches, a plurality of operation sets corresponding to a plurality of operation groups, at S940. In this case, the plurality of operation sets may include one or more forward propagation operation sets associated with one or more forward propagation operation groups and one or more backward propagation operation sets associated with one or more backward propagation operation groups.

The processor may determine an accelerator allocated with each of the plurality of operation sets and the processing sequence thereof such that each of the plurality of operation sets is processed in one of a plurality of accelerators. The processor may determine that each of a plurality of forward propagation operation sets associated with a specific micro-batch be sequentially processed in different accelerators. Additionally, the processor may determine that each of a plurality of backward propagation operation sets associated with the specific micro-batch be sequentially processed in the reverse order to the order of the accelerator in which the plurality of forward propagation operation sets associated with the specific micro-batch are sequentially processed.

The processor may determine that processing of the plurality of backward propagation operation sets associated with the specific micro-batch starts immediately after processing of each of a plurality of forward propagation operation sets associated with the specific micro-batch is completed.

The processor may determine that the forward propagation operation sets and the backward propagation operation sets associated with the plurality of micro-batches be processed to cross each other the maximum number of times in the plurality of accelerators.

The flowchart illustrated in FIG. 9 and the above description are merely examples, and may be implemented differently in some other examples. For example, in some examples, the order of respective steps may be changed, some steps may be repeatedly performed, some steps may be omitted, or some steps may be added.

The method described above may be provided as a computer program stored in a computer-readable recording medium for execution on a computer. The medium may be a type of medium that continuously stores a program executable by a computer, or temporarily stores the program for execution or download. In addition, the medium may be a variety of recording means or storage means having a single piece of hardware or a combination of several pieces of hardware, and is not limited to a medium that is directly connected to any computer system, and accordingly, may be present on a network in a distributed manner. An example of the medium includes a medium configured to store program instructions, including a magnetic medium such as a hard disk, a floppy disk, and a magnetic tape, an optical medium such as a CD-ROM and a DVD, a magnetic-optical medium such as a floptical disk, and a ROM, a RAM, a flash memory, and so on. In addition, other examples of the medium may include an app store that distributes applications, a site that supplies or distributes various software, and a recording medium or a storage medium managed by a server.

The methods, operations, or techniques of the present disclosure may be implemented by various means. For example, these techniques may be implemented in hardware, firmware, software, or a combination thereof. Those skilled in the art will further appreciate that various illustrative logical blocks, modules, circuits, and algorithm steps described in connection with the disclosure herein may be implemented in electronic hardware, computer software, or combinations of both. To clearly illustrate this interchangeability of hardware and software, various illustrative components, blocks, modules, circuits, and steps have been described above generally in terms of their functionality. Whether such a function is implemented as hardware or software varies according to design requirements imposed on the particular application and the overall system. Those skilled in the art may implement the described functions in varying ways for each particular application, but such implementation should not be interpreted as causing a departure from the scope of the present disclosure.

In a hardware implementation, processing units used to perform the techniques may be implemented in one or more ASICs, DSPs, digital signal processing devices (DSPDs), programmable logic devices (PLDs), field programmable gate arrays (FPGAs), processors, controllers, microcontrollers, microprocessors, electronic devices, other electronic units designed to perform the functions described in the present disclosure, computer, or a combination thereof.

Accordingly, various example logic blocks, modules, and circuits described in connection with the present disclosure may be implemented or performed with general purpose processors, DSPs, ASICs, FPGAs or other programmable logic devices, discrete gate or transistor logic, discrete hardware components, or any combination of those designed to perform the functions described herein. The general purpose processor may be a microprocessor, but in the alternative, the processor may be any related processor, controller, microcontroller, or state machine. The processor may also be implemented as a combination of computing devices, for example, a DSP and microprocessor, a plurality of microprocessors, one or more microprocessors associated with a DSP core, or any other combination of the configurations.

In the implementation using firmware and/or software, the techniques may be implemented with instructions stored on a computer-readable medium, such as random access memory (RAM), read-only memory (ROM), non-volatile random access memory (NVRAM), programmable read-only memory (PROM), erasable programmable read-only memory (EPROM), electrically erasable PROM (EEPROM), flash memory, compact disc (CD), magnetic or optical data storage devices, and the like. The instructions may be executable by one or more processors, and may cause the processor(s) to perform certain aspects of the functions described in the present disclosure.

Although the examples described above have been described as utilizing aspects of the currently disclosed subject matter in one or more standalone computer systems, aspects are not limited thereto, and may be implemented in conjunction with any computing environment, such as a network or distributed computing environment. Furthermore, the aspects of the subject matter in the present disclosure may be implemented in multiple processing chips or devices, and storage may be similarly influenced across a plurality of devices. Such devices may include PCs, network servers, and portable devices.

Although the present disclosure has been described in connection with some examples herein, various modifications and changes can be made without departing from the scope of the present disclosure, which can be understood by those skilled in the art to which the present disclosure pertains. In addition, such modifications and changes should be considered within the scope of the claims appended herein.

The invention claimed is:

1. A method executed by one or more processors, the method comprising:

receiving a source program associated with training of a machine learning model;

receiving, based on the source program, a plurality of operation groups comprising operations executed on training data of the machine learning model, wherein the plurality of operation groups comprises:

one or more forward propagation operation groups associated with a forward propagation process of the training data of the machine learning model, and one or more backward propagation operation groups associated with a backward propagation process of the training data of the machine learning model;

generating a plurality of batches from the training data of the machine learning model, wherein each batch of the plurality of batches corresponds to a portion of the training data of the machine learning model;

outputting, for each batch of the plurality of batches, a plurality of operation sets corresponding to the plurality of operation groups comprising:

one or more forward propagation operation sets associated with the one or more forward propagation operation groups, and one or more backward propagation operation sets associated with the one or more backward propagation operation groups;

determining an accelerator of a plurality of accelerators allocated to a corresponding operation set of the plurality of operation sets;

determining a processing sequence of the corresponding operation set of the plurality of operation sets such that each operation set of the plurality of operation sets is processed in one accelerator of the plurality of accelerators; and executing a sequential process of each forward propagation operation set of a plurality of forward propagation operation sets associated with a specific batch of the plurality of batches in different accelerators of the plurality of accelerators according to a first order.

2. The method according to claim 1, further comprising:

executing a sequential process of each backward propagation operation set of a plurality of backward propagation operation sets associated with the specific batch of the plurality of batches in the different accelerators of the plurality of accelerators according to a reverse order of the first order.

3. The method according to claim 1, further comprising:

determining a processing time of the one or more backward propagation operation sets associated with the specific batch of the plurality of batches that starts after completion of processing of each forward propagation operation set of the one or more forward propagation operation sets associated with the specific batch of the plurality of batches is completed.

4. The method according to claim 1, further comprising:

determining that the one or more forward propagation operation sets and the one or more backward propagation operation sets associated with the plurality of batches are to be processed to cross each other a maximum number of times in the plurality of accelerators.

5. The method according to claim 1, wherein the determining the plurality of operation groups comprises:

determining a plurality of processing times for the plurality of operation groups for same training data of the machine learning model; and determining the plurality of operation groups such that a difference between each processing time of the plurality of processing times is less than a predetermined threshold value.

6. The method according to claim 1, wherein the generating the plurality of batches comprises:

determining a plurality of processing times for the plurality of operation sets associated with the plurality of batches; and generating the plurality of batches such that a difference between each processing time of the plurality of processing times is less than a predetermined threshold value.

7. The method according to claim 1, wherein a size of each batch of the plurality of batches is based on a quantity of accelerators of the plurality of accelerators.

8. A computing device comprising:

one or more processors; and a memory storing instructions that, when executed by one or more processors, cause the computing device to:

receive a source program associated with training of a machine learning model;

receive, based on the source program, a plurality of operation groups comprising operations executed on training data of the machine learning model, wherein the plurality of operation groups comprises:

one or more forward propagation operation groups associated with a forward propagation process of the training data of the machine learning model, and one or more backward propagation operation groups associated with a backward propagation process of the training data of the machine learning model;

generate a plurality of batches from the training data of the machine learning model, wherein each batch of the plurality of batches corresponds to a portion of the training data of the machine learning model;

output, for each batch of the plurality of batches, a plurality of operation sets corresponding to the plurality of operation groups comprising:

one or more forward propagation operation sets associated with the one or more forward propagation operation groups, and one or more backward propagation operation sets associated with the one or more backward propagation operation groups;

determine an accelerator of a plurality of accelerators allocated to a corresponding operation set of the plurality of operation sets;

determine a processing sequence of the corresponding operation set of the plurality of operation sets such that each operation set of the plurality of operation sets is processed in one accelerator of the plurality of accelerators; and execute a sequential process of each forward propagation operation set of a plurality of forward propagation operation sets associated with a specific batch of the plurality of batches in different accelerators of the plurality of accelerators according to a first order.

9. The computing device according to claim 8, wherein the instructions, when executed by the one or more processors, further cause the computing device to:

execute a sequential process of each backward propagation operation set of a plurality of backward propagation operation sets associated with the specific batch of the plurality of batches in the different accelerators of the plurality of accelerators according to a reverse order of the first order.

10. The computing device according to claim 8, wherein the instructions, when executed by the one or more processors, further cause the computing device to:

determine a processing time of the one or more backward propagation operation sets associated with the specific batch of the plurality of batches that starts after completion of processing of each forward propagation operation set of the one or more forward propagation operation sets associated with the specific batch of the plurality of batches is completed.

11. The computing device according to claim 8, wherein the instructions, when executed by the one or more processors, further cause the computing device to:

determine that the one or more forward propagation operation sets and the one or more backward propagation operation sets associated with the plurality of batches are to be processed to cross each other a maximum number of times in the plurality of accelerators.

12. The computing device according to claim 8, wherein the instructions, when executed by the one or more processors, further cause the computing device to determine the plurality of operation groups by causing the computing device to:

determine a plurality of processing times for the plurality of operation groups for same training data of the machine learning model; and determine the plurality of operation groups such that a difference between each processing time of the plurality of processing times is less than a predetermined threshold value.

13. The computing device according to claim 8, wherein the instructions, when executed by the one or more processors, further cause the computing device to generate the plurality of batches by causing the computing device to:

determine a plurality of processing times for the plurality of operation sets associated with the plurality of batches; and generate the plurality of batches such that a difference between each processing time of the plurality of processing times is less than a predetermined threshold value.

14. The computing device according to claim 8, wherein a size of each batch of the plurality of batches is based on a quantity of accelerators of the plurality of accelerators.

15. One or more non-transitory computer-readable media storing instructions that, when executed by one or more processors of a computing device, cause the computing device to:

receive a source program associated with training of a machine learning model;

receive, based on the source program, a plurality of operation groups comprising operations executed on training data of the machine learning model, wherein the plurality of operation groups comprises:

one or more forward propagation operation groups associated with a forward propagation process of the training data of the machine learning model, and one or more backward propagation operation groups associated with a backward propagation process of the training data of the machine learning model;

generate a plurality of batches from the training data of the machine learning model, wherein each batch of the plurality of batches corresponds to a portion of the training data of the machine learning model;

output, for each batch of the plurality of batches, a plurality of operation sets corresponding to the plurality of operation groups comprising:

one or more forward propagation operation sets associated with the one or more forward propagation operation groups, and one or more backward propagation operation sets associated with the one or more backward propagation operation groups;

determine an accelerator of a plurality of accelerators allocated to a corresponding operation set of the plurality of operation sets;

determine a processing sequence of the corresponding operation set of the plurality of operation sets such that each operation set of the plurality of operation sets is processed in one accelerator of the plurality of accelerators; and execute a sequential process of each forward propagation operation set of a plurality of forward propagation operation sets associated with a specific batch of the plurality of batches in different accelerators of the plurality of accelerators according to a first order.

16. The one or more non-transitory computer-readable media according to claim 15, wherein the instructions, when executed by the one or more processors of the computing device, further cause the computing device to:

execute a sequential process of each backward propagation operation set of a plurality of backward propagation operation sets associated with the specific batch of the plurality of batches in the different accelerators of the plurality of accelerators according to a reverse order of the first order.

17. The one or more non-transitory computer-readable media according to claim 15, wherein the instructions, when executed by the one or more processors of the computing device, further cause the computing device to:

determine a processing time of the one or more backward propagation operation sets associated with the specific batch of the plurality of batches that starts after completion of processing of each forward propagation operation set of the one or more forward propagation operation sets associated with the specific batch of the plurality of batches is completed.

18. The one or more non-transitory computer-readable media according to claim 15, wherein the instructions, when executed by the one or more processors of the computing device, further cause the computing device to:

determine that the one or more forward propagation operation sets and the one or more backward propagation operation sets associated with the plurality of batches are to be processed to cross each other a maximum number of times in the plurality of accelerators.

19. The one or more non-transitory computer-readable media according to claim 15, wherein the instructions, when executed by the one or more processors of the computing device, further cause the computing device to determine the plurality of operation groups by causing the computing device to:

determine a plurality of processing times for the plurality of operation groups for same training data of the machine learning model; and determine the plurality of operation groups such that a difference between each processing time of the plurality of processing times is less than a predetermined threshold value.

20. The one or more non-transitory computer-readable media according to claim 15, wherein the instructions, when executed by the one or more processors of the computing device, further cause the computing device to generate the plurality of batches by causing the computing device to:

determine a plurality of processing times for the plurality of operation sets associated with the plurality of batches; and generate the plurality of batches such that a difference between each processing time of the plurality of processing times is less than a predetermined threshold value.

* * * * *